United States Patent
Larsen et al.

(10) Patent No.: US 8,024,657 B2
(45) Date of Patent: Sep. 20, 2011

(54) VISUALLY ENCODING NODES REPRESENTING STAGES IN A MULTI-STAGE VIDEO COMPOSITING OPERATION

(75) Inventors: Eric Larsen, Clackamas, OR (US); Ron Brinkmann, Hermosa Beach, CA (US); Dan Candela, Beverly Hills, CA (US)

(73) Assignee: Apple Inc., Cupertino, CA (US)

( * ) Notice: Subject to any disclaimer, the term of this patent is extended or adjusted under 35 U.S.C. 154(b) by 1642 days.

(21) Appl. No.: 11/271,162

(22) Filed: Nov. 11, 2005

(65) Prior Publication Data
US 2006/0233537 A1     Oct. 19, 2006

Related U.S. Application Data

(63) Continuation-in-part of application No. 11/107,331, filed on Apr. 16, 2005, now Pat. No. 7,417,646.

(51) Int. Cl.
G06F 3/00  (2006.01)
G11B 27/00  (2006.01)
H04N 5/93  (2006.01)

(52) U.S. Cl. ......... 715/723; 715/716; 386/278; 386/282

(58) Field of Classification Search ............... 386/52, 386/56, 64, 278–290; 715/716, 723
See application file for complete search history.

(56) References Cited

U.S. PATENT DOCUMENTS

| | | | |
|---|---|---|---|
| 6,556,205 B1 | 4/2003 | Gould et al. | |
| 6,633,309 B2 * | 10/2003 | Lau et al. | 715/723 |
| 6,683,619 B1 | 1/2004 | Samra | |
| 6,700,579 B2 | 3/2004 | Gould | |
| 6,791,552 B2 | 9/2004 | Gould et al. | |
| 6,828,984 B2 | 12/2004 | Samra | |
| 6,851,090 B1 * | 2/2005 | Gutta et al. | 715/716 |
| 6,867,782 B2 | 3/2005 | Gaudette et al. | |
| 7,103,839 B1 | 9/2006 | Natkin et al. | |
| 7,187,844 B1 * | 3/2007 | Terao et al. | 386/56 |
| 7,417,646 B1 | 8/2008 | Larsen et al. | |
| 2002/0059202 A1 * | 5/2002 | Hadzikadic et al. | 707/3 |
| 2004/0205575 A1 * | 10/2004 | Wattenberg | 715/513 |
| 2004/0225416 A1 * | 11/2004 | Kubota et al. | 701/1 |

OTHER PUBLICATIONS

Notice of Allowance of U.S. Appl. No. 11/107,331, Apr. 28, 2008 (mailing date), Larsen, Eric, et al. Non-Final Office Action of U.S. Appl. No. 11/107,331, Oct. 16, 2007 (mailing date), Larsen, Eric, et al.
Updated portions of prosecution history of U.S. Appl. No. 11/107,331, Jul. 2, 2008, Larsen, Eric, et al.

* cited by examiner

*Primary Examiner* — Thai Tran
*Assistant Examiner* — Hung Q Dang
(74) *Attorney, Agent, or Firm* — Adeli & Tollen LLP

(57) ABSTRACT

Some embodiments of the invention provide a user interface of editing video through a multi-stage editing process. The user interface selects a particular stage in the editing process. A particular editing operation is performed on a set of video images during the particular stage. After the selection of the particular stage, the user interface uses a background rendering process to render the result of the particular editing operation on the particular set of video images. The background rendering process is a process that the user interface performs separately from the multi-stage video editing process, so that a user may continue editing the video sequence while the rendering occurs. Some embodiments provide a preview of the rendering process in a preview window. Some of these embodiments update the preview in real time. In some embodiments, the rendering occurs to a temporary location and then stores to a persistent storage. In some of these embodiments, an entry for the stored render's location is logged in a list of entries that allows the stored render to be catalogued and retrieved from the persistent storage. The temporary location and the persistent storage can be part of a non-volatile memory such as a hard drive.

22 Claims, 14 Drawing Sheets

VISUALLY ENCODING NODES REPRESENTING STAGES IN A MULTI-STAGE VIDEO COMPOSITING OPERATION

CLAIM OF BENEFIT

This application is a continuation-in-part of U.S. patent application Ser. No. 11/107,331, filed on Apr. 16, 2005, now issued as U.S. Pat. No. 7,417,646.

BACKGROUND

Video editing is an arduous and time-consuming process. Tools have been developed to assist and enable those performing the difficult task of video editing. However, video editing tools can themselves be highly complex and thus, provide their own challenges to the users of such tools.

One difficulty in video editing is providing information to the video editor (user) regarding how the currently applied video editing functions affect the video sequence currently being edited or any number of video sequences previously edited. At any given time during the video editing process, the user may need a preview of the results of the previous editing work, i.e., the edited frames. Often, a succeeding section of the video sequence depends upon the output of the video editing functions on a preceding section of the video sequence. Thus, a user could spend a significant amount of time merely waiting while renders are generating. This waiting is particularly inefficient if the user only wishes to preview a small section of video from a long video sequence. The video editing process and wait time can be even more drawn out and obtuse if the prior renders and tasks cannot be stored and retrieved in an organized fashion but must constantly be re-rendered, even when unchanged. The waiting is also inefficient if the entire video project must be re-rendered to reflect every individual change.

Thus, there is a need for a video editing process that allows background rendering to occur while other video editing is performed. There is also a need for a method that stores and retrieves multiple renders at various times, for different data, to and from different locations.

SUMMARY OF THE INVENTION

Some embodiments of the invention provide a method of editing video through a multi-stage editing process. The method selects a particular stage in the editing process. A particular editing operation is performed on a set of video images during the particular stage. After the selection of the particular stage, the method uses a background rendering process to render the result of the particular editing operation on the particular set of video images. The background rendering process is a process that the method performs separately from the multi-stage video editing process, so that a user may continue editing the video sequence while the rendering occurs. Some embodiments provide a preview of the rendering process in a preview window. Some of these embodiments update the preview in real time.

In some embodiments, the rendering occurs to a temporary location and then stores to a persistent storage. In some of these embodiments, an entry for the stored render's location is logged in a list of entries that allows the stored render to be catalogued and retrieved from the persistent storage. The temporary location and the persistent storage can be part of a non-volatile memory such as a hard drive.

Some embodiments illustrate the multi-stage video compositing process as a "composite tree" formed by several nodes. Each particular node in this tree represents a particular stage in the video compositing process (i.e., represents a particular editing operation in the video compositing process). In some embodiments, the nodes are selectable items in a graphical user interface. In some of these embodiments, a user can select a particular node and initiate a background render process for this particular node, in order to render the result of the editing operation associated with the particular node.

After such a rendering, some embodiments change a visible attribute of the particular node to indicate that its associated operation has been rendered and stored. For instance, in some embodiments, the particular node changes color to indicate completion of background rendering and storage. Alternatively, in some embodiments, the node changes shape or blinks to indicate rendering and storage completion.

Some embodiments use two or more visible attributes of a particular node to indicate the cache state of the node instead of indicating its rendering state. For instance, some embodiments illustrate three different cache states of a node by using three different colors: (1) a first color to indicate that the node has not yet been rendered or has been rendered but the rendered results are not in a disk cache or a memory cache, (2) a second color to indicate that the node has been rendered and the rendered results are in the disk cache, and (3) a third color to indicate that the node's rendered results are in the memory cache. In some embodiments, the cache memory space represents storage locations in the memory space (i.e., in the volatile memory and non-volatile storage) of the computer system that are particularly allocated for the video-compositing application. These areas can be on the disk storage or the random access memory of the computer system, and, in some embodiments, they are only accessible by the video compositing application and no other application that is running on the computer system.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Figure 1:
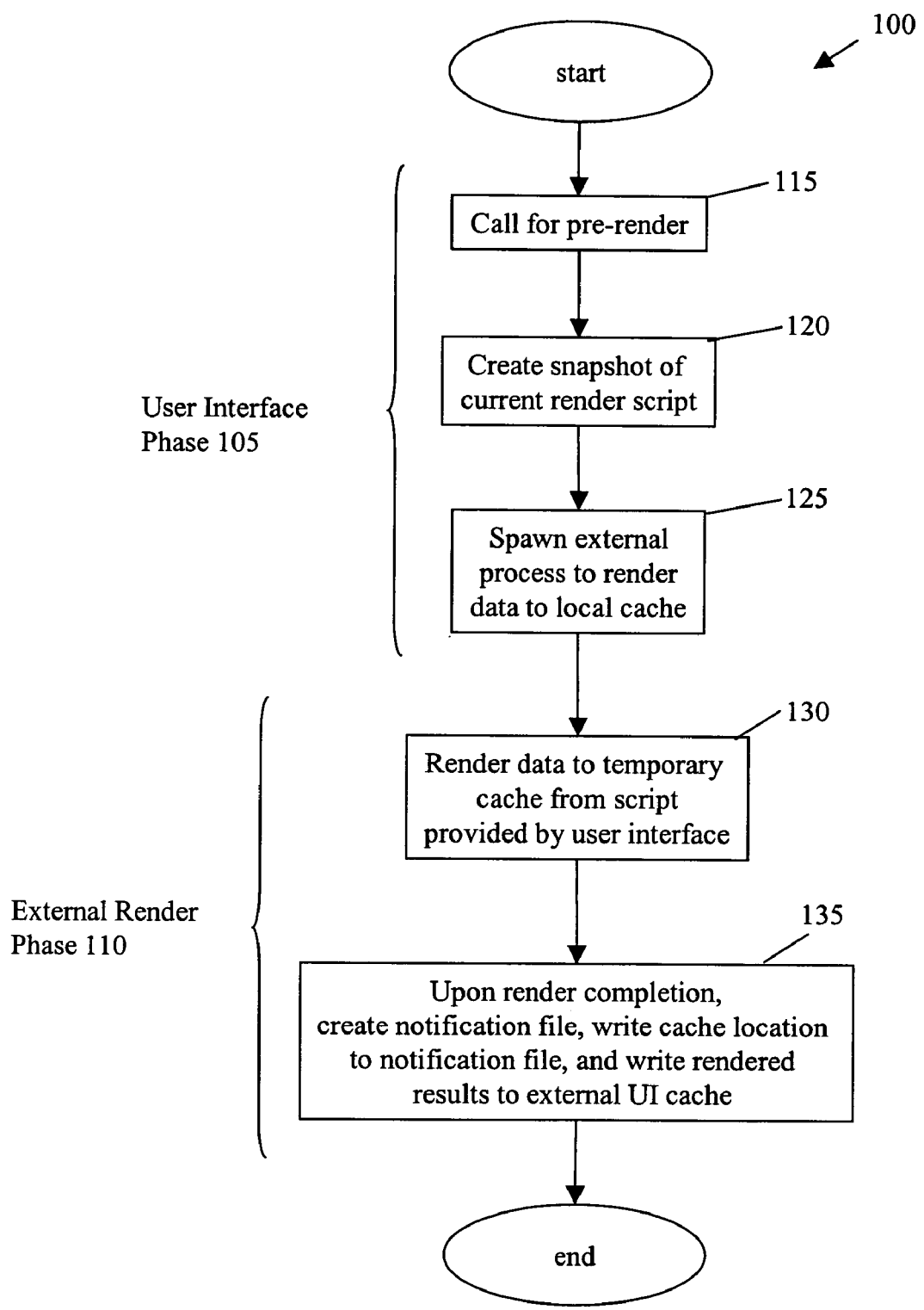
FIG. 1 illustrates a process flow for a user interface cache render that spawns an external cache render process.

In the following description, numerous details are set forth for purpose of explanation. However, one of ordinary skill in the art will realize that the invention may be practiced without the use of these specific details. In other instances, well-known structures and devices are shown in block diagram form in order not to obscure the description of the invention with unnecessary detail.

I. Overview

Some embodiments of the invention provide a method of editing video through a multi-stage editing process. The method selects a particular stage in the editing process. A particular editing operation is performed on a set of video images during the particular stage. After the selection of the particular stage, the method uses a background rendering process to render the result of the particular editing operation on the particular set of video images. The background rendering process is a process that the method performs separately from the multi-stage video editing process, so that a user may continue editing the video sequence while the rendering occurs. Some embodiments provide a preview of the rendering process in a preview window. Some of these embodiments update the preview in real time.

In some embodiments, the rendering occurs to a temporary location and then stores to a persistent storage. In some of these embodiments, an entry for the stored render's location is logged in a list of entries that allows the stored render to be catalogued and retrieved from the persistent storage. The temporary location and the persistent storage can be part of a non-volatile memory such as a hard drive.

Several more detailed embodiments of the invention are described below by reference to FIGS. 1-9. These embodiments are implemented by a video compositing application that illustrates the multistage video compositing process as a "composite tree" formed by several nodes. Each particular node in this tree represents a particular stage in the video compositing process (i.e., represents a particular editing operation in the video compositing process).

In some embodiments, the nodes are selectable items in a graphical user interface. In some of these embodiments, a user can select a particular node and initiate a background render process for this particular node, in order to render the result of the editing operation associated with the particular node. After such a rendering, some embodiments change a visible attribute of the particular node to indicate that its associated operation has been rendered and stored. For instance, in some embodiments, the particular node changes color to indicate completion of background rendering and storage. Alternatively, in some embodiments, the node changes shape or blinks to indicate rendering and storage completion.

Some embodiments reserve local cache storage locations for the video composting application in the memory space (i.e., in the volatile memory and non-volatile storage) of the computer system. The local cache storage is allocated separately for the video-compositing application. Specifically, in some embodiments, the local cache storage can only be used by the video compositing application and no other application that is running on the computer system. In some embodiments, the user can modify the size of the local cache storage.

Some of these embodiments render a node to a temporary storage location and then store the rendered results to an external storage location, where the external storage location and the temporary storage locations are external to the local cache storage for the video-compositing process of the video-compositing application. The external and temporary storage locations are non-volatile storages (e.g., they are locations on the hard drive of the computer system) in some embodiments. Some of these embodiments retrieve the rendered results from the external storage locations into the local cached storage locations whenever the video compositing application tries to retrieve cached results. Such caching is useful for rapid retrieval and review of video compositing results.

Section II below describes the process and architecture of some embodiments in further detail. Section III then describes the implementation of a user interface for some of these embodiments.

II. Background Render Process and Architecture

FIG. 1 illustrates a background render process 100 of a user interface of some embodiments of the invention. As shown in this figure, the background render process 100 has two phases: (1) a user interface phase 105, and (2) an external render phase 110. The user interface phase 105 begins at step 115 when a request is made to pre-render a specified set of frames in a sequence of frames that the user is editing. As further described in Section III, some embodiments allow the user to request a forced render at a point in the video sequence by inserting a Cache Node in the video compositing tree and calling a function "Render Cache Nodes." Instead of, or in conjunction with such cache nodes, some embodiments might allow pre-rendering to be initiated by some other user request or automated process.

When the background render process 100 receives a call to render, the background render process 100 creates a snapshot of the current render script at step 120. This snapshot saves the state of the set of frames that are specified for rendering. The snapshot includes any video editing functions that have been applied to the set of frames.

Next, at step 125, the background render process 100 spawns an external process (1) to render the selected frames based on the state of the frames in the snapshot and (2) to store the rendering to a temporary location. The render script of some embodiments contains a unique identifier generated by using the particular stage in the editing process that calls for the render (i.e., the node in the node tree). In these embodiments, the unique identifier may be used to store and later retrieve the requested render.

The external render process 110 then renders (at 130) the frame to the temporary location by using the script provided by the user interface. Once the rendering is completed (at 135), the background render process 100 (at 135) transfers the rendered results into an external storage, creates a notification file, and writes in the notification file the location of the rendered results in the external storage. As further described below by reference to FIG. 4 the user interface later (1) realizes that rendered results exist in the external UI cache when it discovers the notification file, and (2) after this realization, updates the UI's local cache to include the rendered results before searching through the prior rendered results for a desired cached rendering.

In some embodiments, each rendering request spawns a separate external process, which creates a separate notification file and stores its rendered results to a separate location in the external storage. In these embodiments, multiple render requests can be performed at various times and stored and/or indexed upon completion. Moreover, each of these separate external processes can execute simultaneously as background processes while the user and system continue to perform other video compositing operations in the multi-stage video compositing process.

Figure 2:
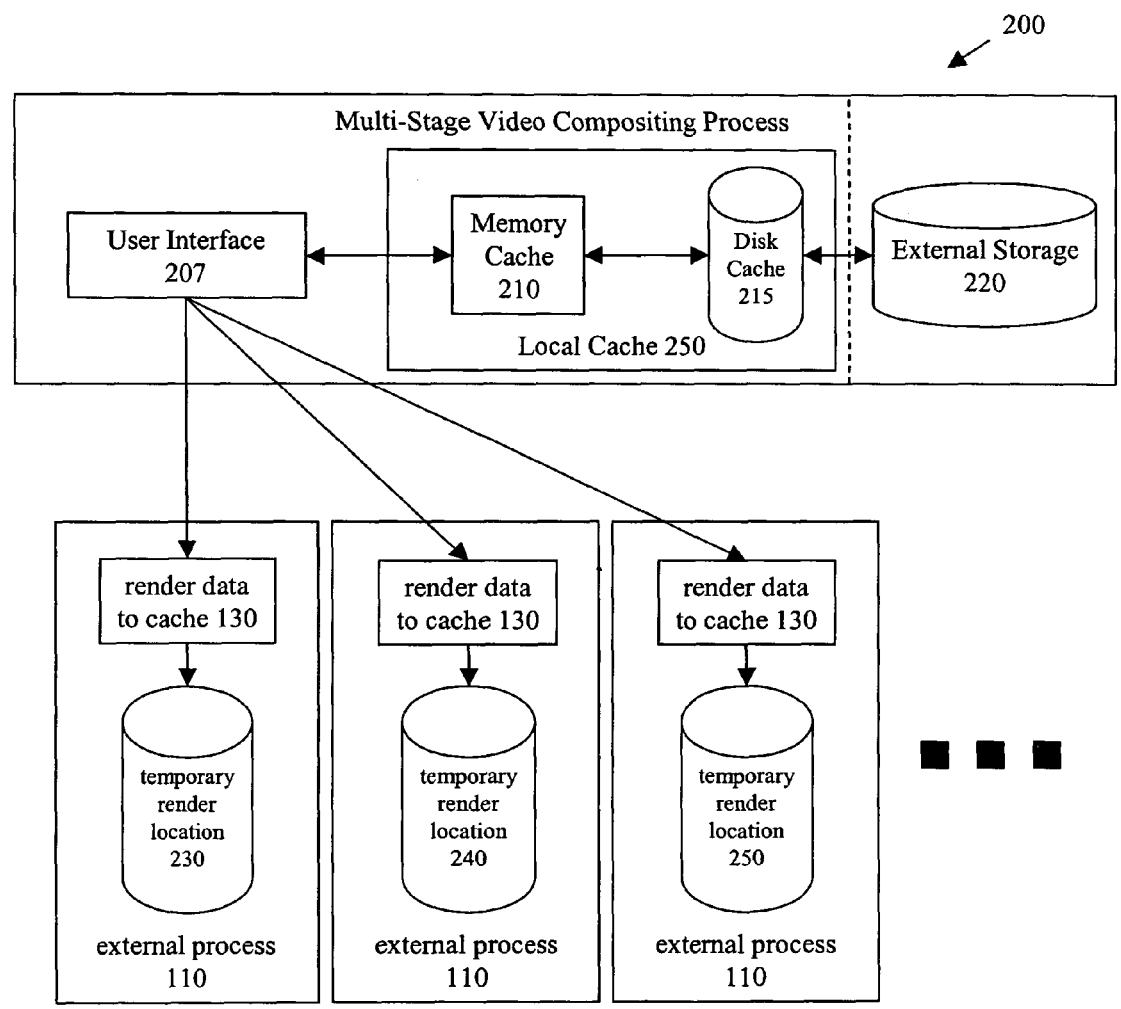
FIG. 2 illustrates an architecture for a user interface cache render that spawns multiple external cache render processes.

FIG. 2 illustrates a block diagram of a portion of a multi-stage video compositing process 200, which has spawned multiple external render processes 110. As shown in this figure, the user interface process includes a user interface 207 that presents a video-compositing tree to the user. Through this UI 207, the user can request certain nodes to be rendered in background through an external render process. The UI searches for rendered results in a local cache 250 that is formed by a memory cache 210 and a disk cache 215.

Figure 3:
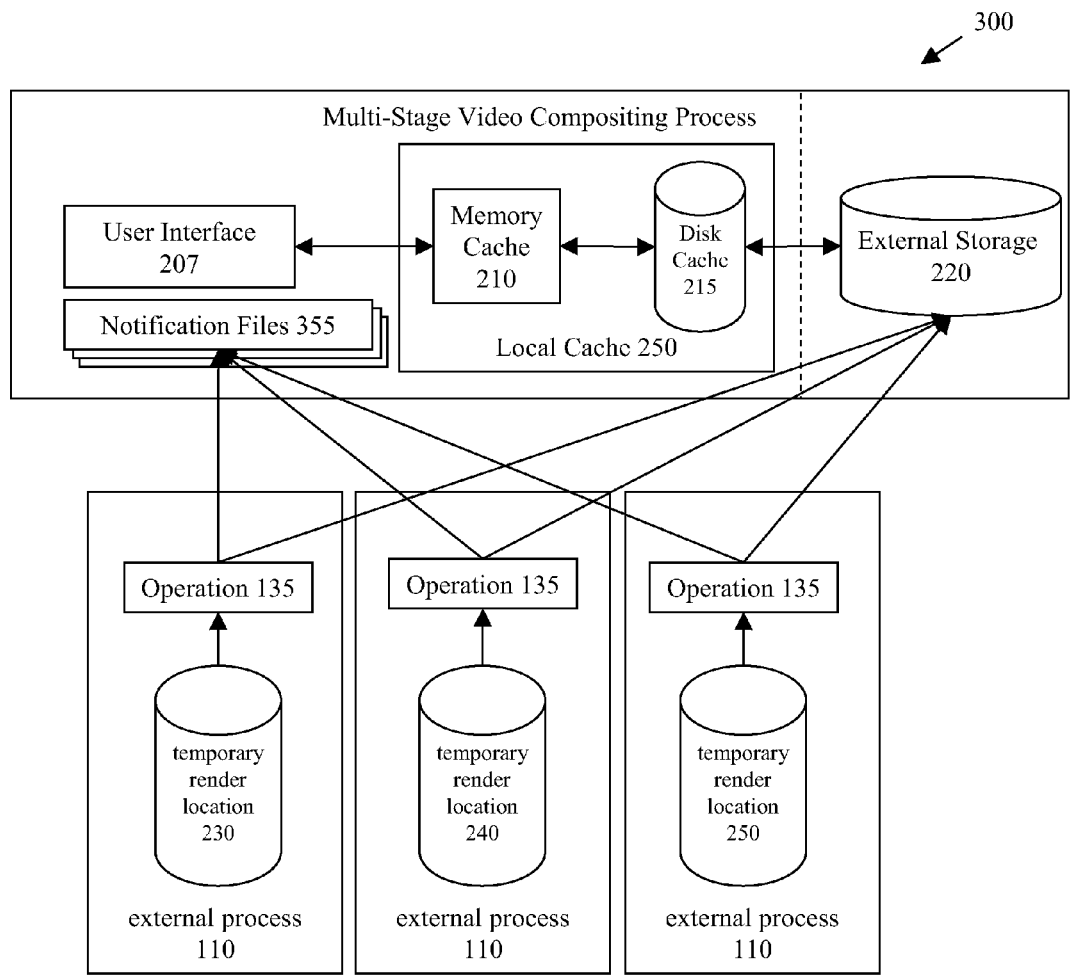
FIG. 3 illustrates completion of the external cache render processes.

As mentioned above, FIG. 2 illustrates several external render processes 110 that have been spawned by the UI. Each render process performs a render operation 130 to a temporary location (e.g., 230, 240, and 250). Once its render operation 130 is complete, the external process 110 performs the operation 135, as shown in FIGS. 1 and 3. As shown in these figures, the operation 135 (1) transfers the rendered results into an external storage 220, (2) creates a notification file 355, and (3) writes in the notification file 355 the location of the rendered results in the external storage 220.

As mentioned above, a notification file 355 informs the UI 207 that rendered results exist in the external storage, and that hence the UI's local cache has to be updated to include the rendered results before searching through the prior rendered results for a desired cached rendering. This realization and update will now be further described by reference to FIG. 4. This figure illustrates a retrieval process 400 that the video compositing application employs to search for previously rendered results in its local cache (formed by memory cache 210 and disk cache 215).

Figure 4:
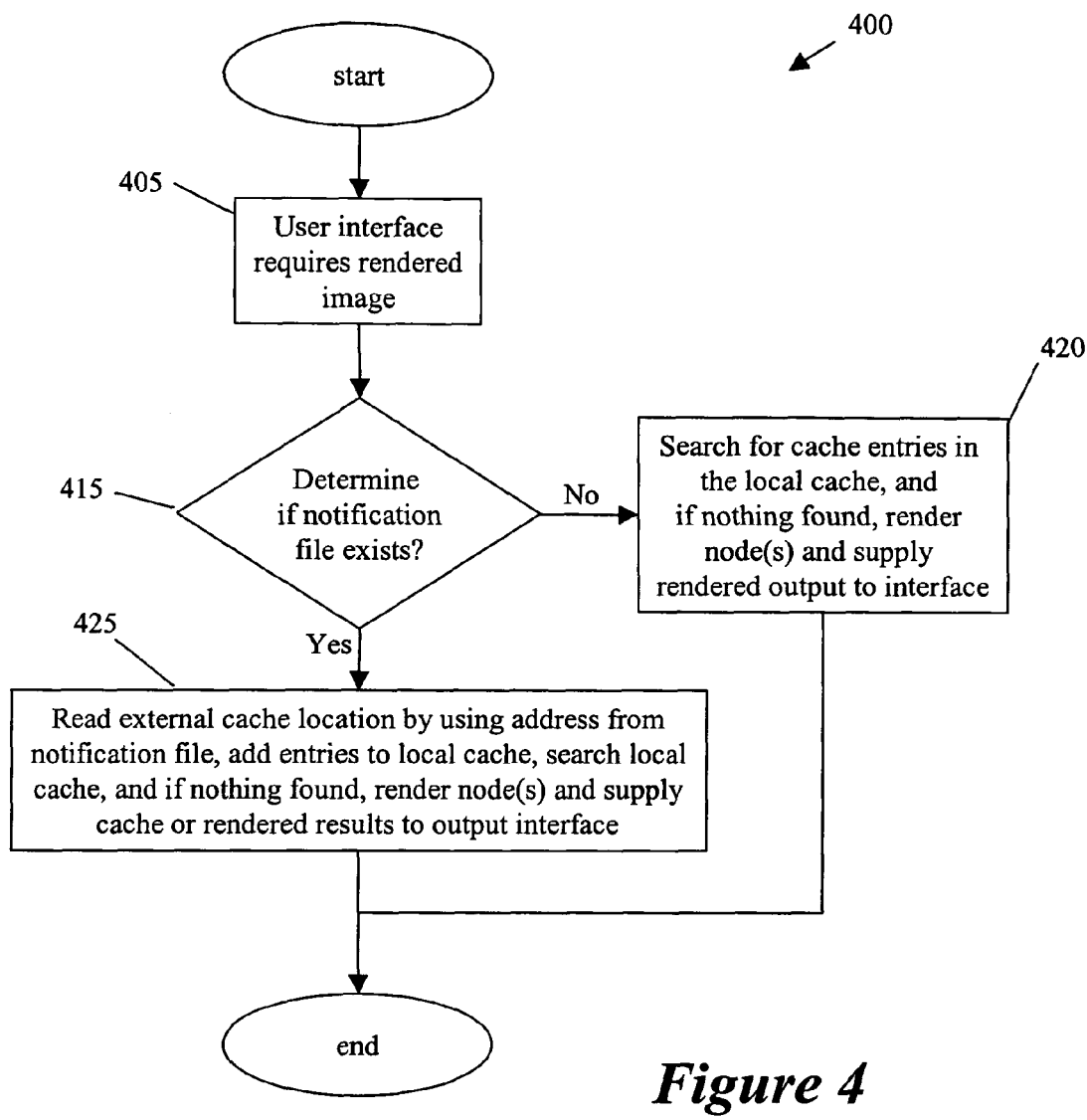
FIG. 4 illustrates a process flow for a user interface searching cache for data.

As shown FIG. 4, the process 400 starts when the user interface 207 requires (at 405) the rendering of a node in the video compositing tree. As mentioned above, and further elaborated below, one example of such a node is a cache node that is inserted in the video compositing tree and is selected for background rendering.

In some embodiments, this requirement may arise due to an explicit request by the user of the user interface, or may be automatically generated by the UI for the rendering of another node or for some other reason in the course of video editing. Regardless of how the rendering request is generated, the retrieval process 400 first tries to determine if the requested node was previously rendered. To do that, it has to search the UI's local cache 250 to determine whether it has rendered results for the requested node. However, before performing this search, the UI might first have to update its local cache 250.

Accordingly, the process determines (at 415) whether a notification file exists. If no such file exists, the retrieval process 400 searches (at 420) the UI's local cache 250 for an entry that matches a unique identifier for the requested node. In some embodiments, this unique identifier is generated based on the location of the node in the video compositing tree, and the values of the parameters of the video-compositing operations represented by the requested node and all its parent nodes in the tree. If the process 400 does not find (at 420) an entry for the requested data in the UI's local cache 250, then the retrieval process 400 performs a rendering operation (at 420) for the requested node and supplies the rendered results to the UI. On the other hand, when the process finds (at 420) an entry for the requested node, the process (at 420) retrieves the cached rendered results and supplies them to the UI.

When the process identifies one or more notification files at 415, the process (at 425) retrieves the address location(s) stored in the notification files and discards the notification files. The retrieved address location or locations identify places in the external storage 220 that store the results of previous background rendering operations that have not yet percolated to the local cache 250 of the UI. Hence, from the retrieved address location(s), the process then (at 425) retrieves the rendered results of one or more previous background rendering operations, and stores these rendered results in the local cache 250.

After updating the local cache at 425, the process then searches the UI's local cache 250 for an entry that matches a unique identifier for the requested node. If the process 400 does not find (at 425) an entry for the requested data in the UI's local cache 250, then the retrieval process 400 performs a rendering operation (at 425) for the requested node and supplies the rendered results to the UI. On the other hand, when the process finds (at 425) an entry for the requested node, the process (at 425) retrieves the cached rendered result and supplies it to the UI.

III. User Interface

Figure 5:
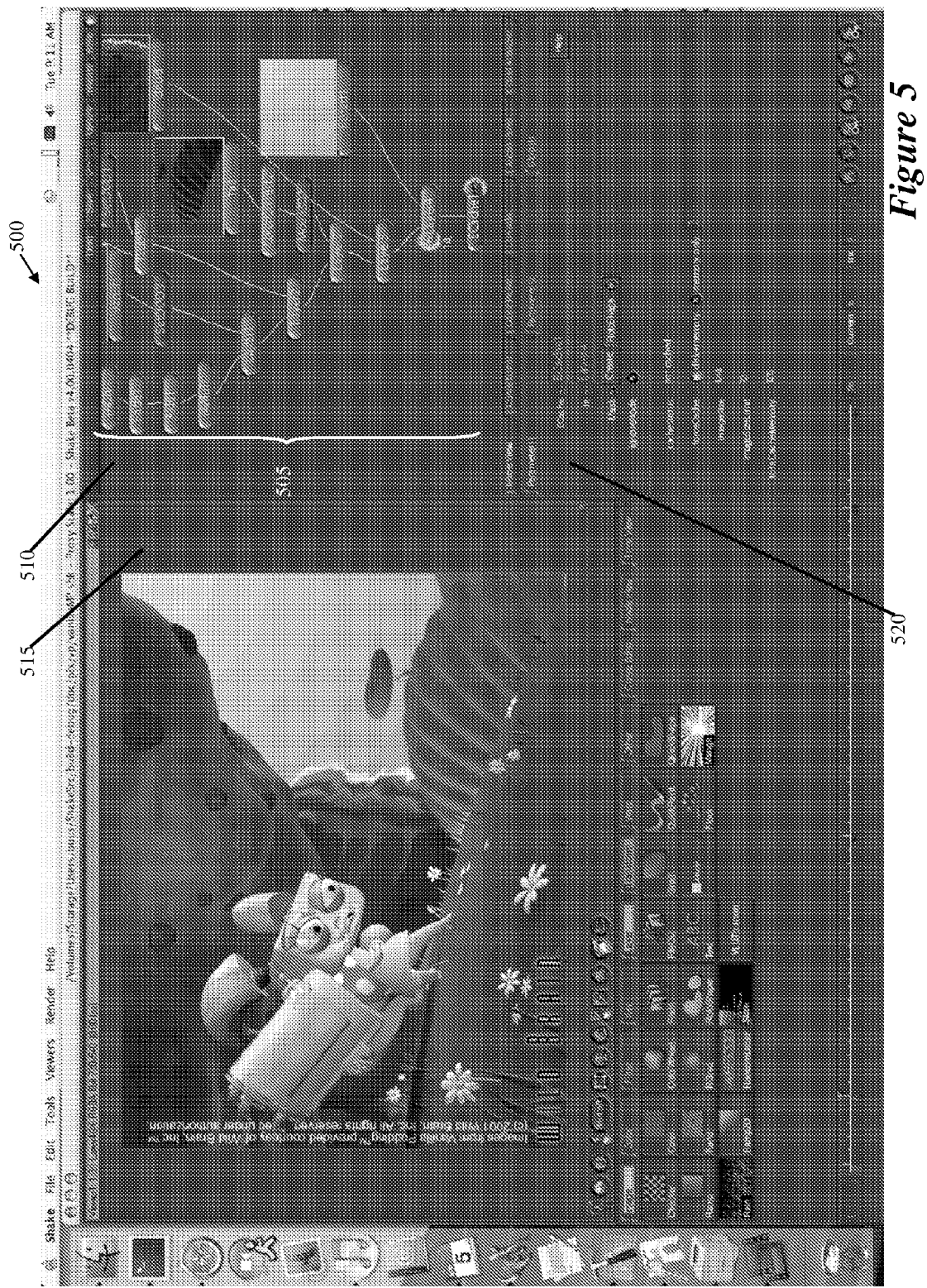
FIG. 5 illustrates a user interface containing an uncached node.

FIG. 5 illustrates a user interface 500 containing a video-composite node tree 505. The user interface includes a node view pane 510, a viewer pane 515, and a tweaked pane 520. The node tree 505 is illustrated in the node view pane 510 of the user interface 500. The node tree 505 represents the elements of a video sequence currently being edited including any functions applied to those elements. For instance, the node Layer4 represents an element of a video sequence illustrated by the node tree 505. Since the node Layer4 is connected directly or indirectly to all the nodes above it in the node tree 505, the node Layer4 represents the culmination of all the nodes (e.g., all the elements and functions) above it in the node tree 505. As shown in this figure, an indicator light on the left of the node Layer4 indicates that this node is currently active, i.e., currently previewed in the viewer pane 515 to facilitate a user's editing of the node Layer4.

In FIG. 5, a user has manually inserted an external cache node Ecache1 and linked this node to the node Layer4. The node Ecache1 allows the user to apply a variety of caching functions to the node Layer4 that facilitate the user's editing of the video sequence represented by the node tree 505. For instance, the user might select a forced render to cache of the node Layer4 (and all the nodes in the tree "upstream" or connected in the tree above the node Layer4). As mentioned above some embodiments allow this rendering to be performed in a background process such that the user can continue editing the node tree 505 (e.g., adding or deleting nodes, changing the connections between the nodes, changing parameter values, etc.) while the render is being performed.

Also, as described above, some embodiments store the background render in an external storage and create an entry that specifies the location of the rendered results in the external storage for later retrieval by the UI during an update of its local cache. The ability to pre-render and cache one or more segments of a lengthy and complex video editing process (represented in some embodiments by one or more node trees, e.g., node tree 505) greatly improves video editing for the user and particularly reduces unproductive redundant processing and waiting time.

In some embodiments, the node Ecache1 glows red to indicate that this node cannot be loaded from a cache location. This might be because the node has not yet been rendered to a cache location. In these embodiments, this indicator conveys to a user that it may be useful to perform pre-rendering and caching of this node.

The user may click on the right of the node Ecache1 to view the parameters (including the caching parameters) associated with this node in the tweaked pane 520. In some embodiments, an indicator light on the right of the node Ecache1 indicates that this node's parameters are currently available for review and adjustment in the tweaked pane 520.

Figure 6:
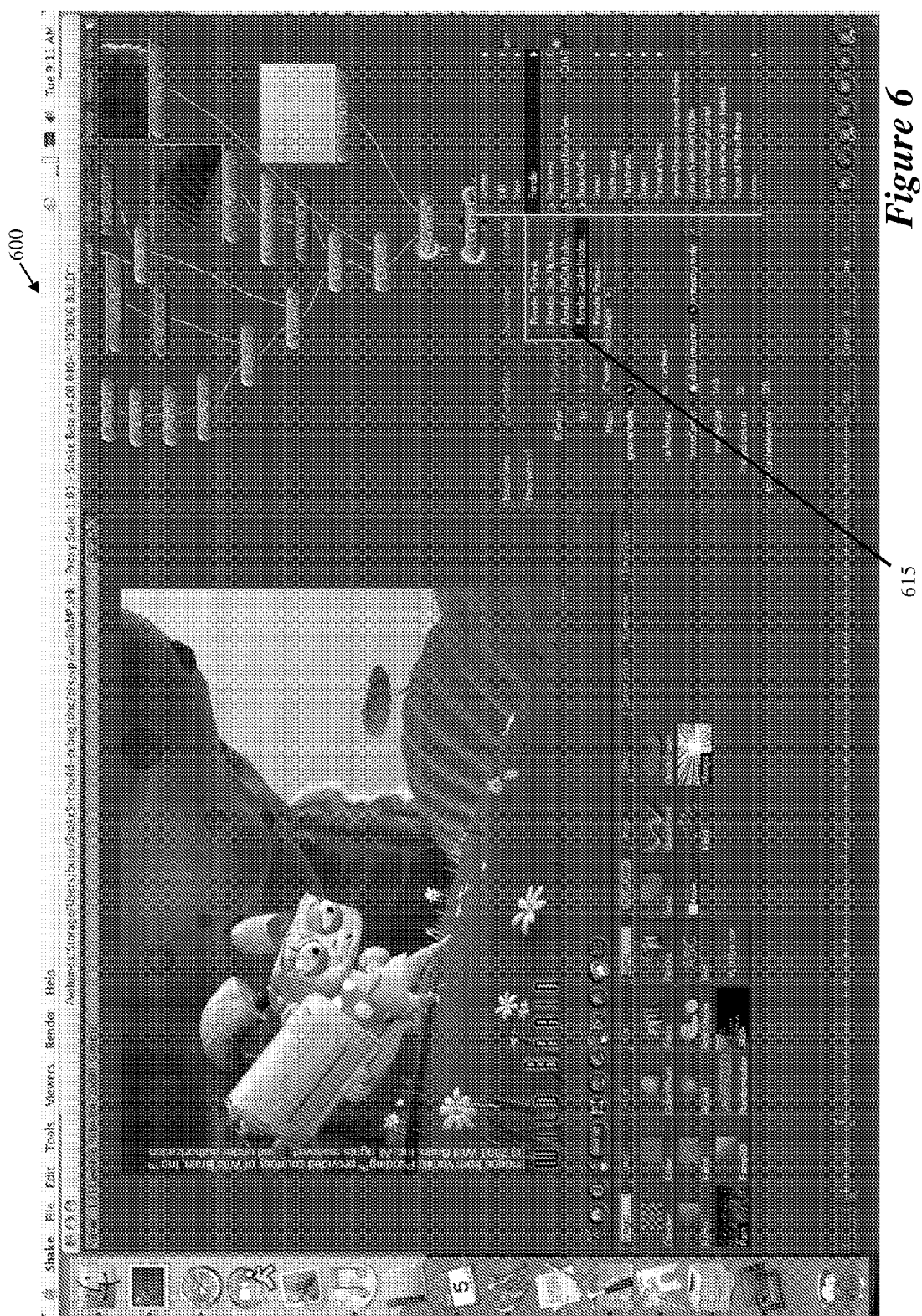
FIG. 6 illustrates a user interface with a drop down menu that includes a render selection and types of renders.
Figure 7:
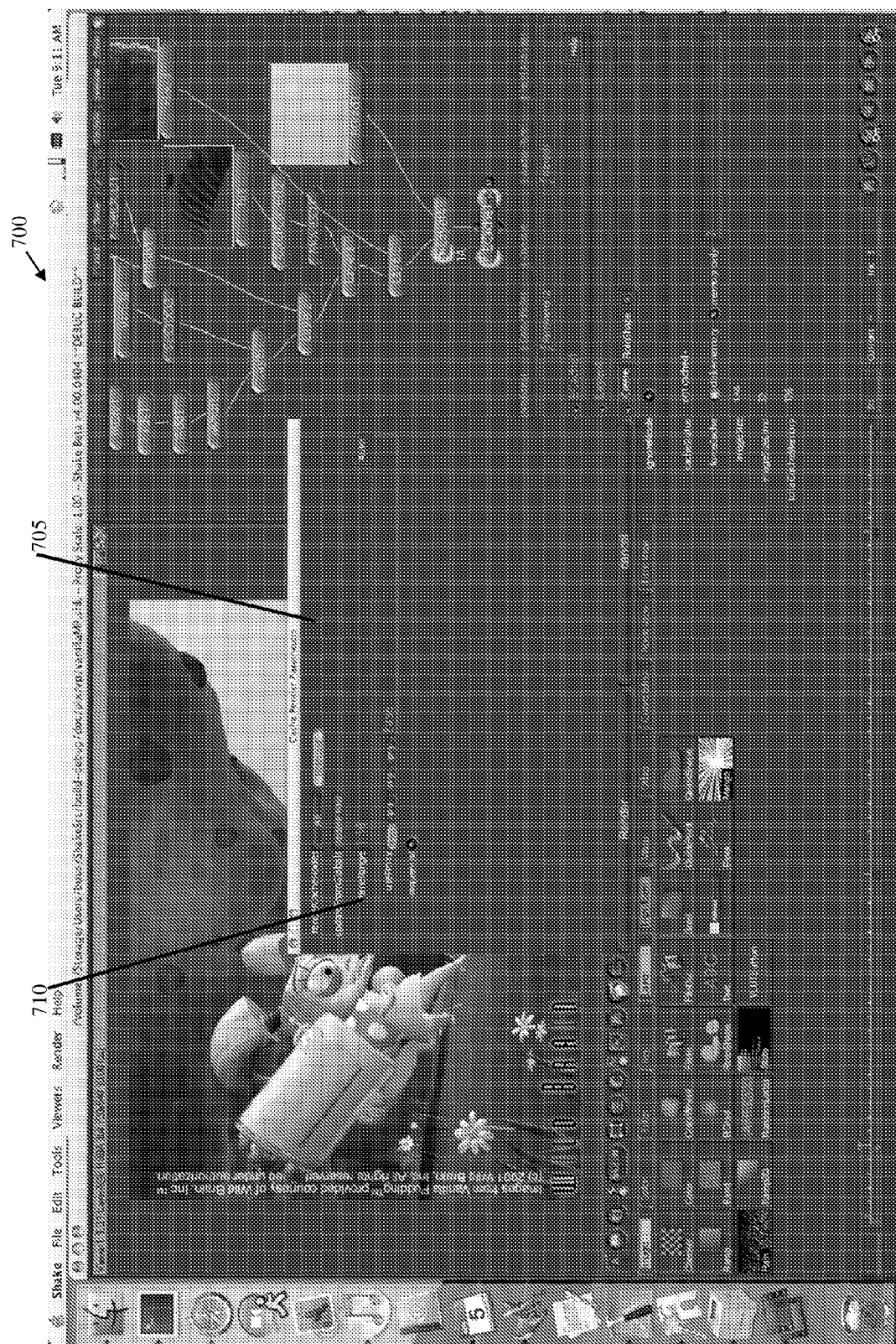
FIG. 7 illustrates a user interface including a dialog box for adjusting parameters of a render to cache function.

FIG. 6 illustrates one way for the user to initiate a forced render operation on the cache node. Specifically, it illustrates a user interface 600 with a drop down menu 615 that includes a render selection and types of renders. As shown in this figure, the user may select Render Flipbook, Render Disk Flipbook, Render FileOut Nodes, Render Cache Nodes, or Render Proxies from the Render drop down menu 615. In this example, the user has selected the "Render Cache Nodes" option. Once the user selects the "Render Cache Nodes" option, the user is presented with a dialog box 705 for adjusting parameters of a render to cache function, as shown in FIG. 7. As shown in this figure, some embodiments allow a user to specify all or select nodes for rendering. Some embodiments also allow the user to set the frame range within the video sequence of images currently being edited to render and store to a cache location. In some embodiments, this parameter is specified as a time range 710 for the video frames.

Some embodiments further allow the user to set the proxy level at which to render the selected frames. In some embodiments, the proxy level is the resolution level for the renders. As shown in the dialog box 705, these resolution levels could have pre-determined levels that include Base (full resolution), P1 (half resolution), P2 (quarter resolution), and P3 (one tenth resolution).

Some embodiments may allow the user to alter the pre-determined levels to any user setting. The embodiments described above give the user the advantages of speed and organization. For instance, by selecting groups of nodes or frames, the user may organize and store sections of the video sequence in separate cache locations or files meaningfully. Moreover, at times the user may wish to preview the editing work of a certain section of video without viewing the final output. Rendering a select group of frames or nodes at lower resolution can greatly accelerate the rendering and preview process. Some embodiments provide even greater user feedback and faster previews through a thumbnail preview of one or more current background render processes during run time.

Figure 8:
FIG. 8 illustrates a user interface including a thumbnail preview window of a background render process.

Once the user has specified the desired caching parameters in the dialog box 705, the user can select the "Render" button in this dialog box to initiate the render operation. During this render operation, the user interface in some embodiments provides a thumbnail preview 805 of a background render process, as shown in FIG. 8. In some embodiments, this thumbnail preview 805 updates in real time to indicate to the user the progress of the background render process.

As mentioned above, while the background render process is executing, the user and computer system can continue performing other video compositing operations in the multi-stage video compositing process. For instance, while the background render process is executing, the user can continue adding nodes in the video compositing tree and/or changing the parameters and parameter values of the nodes in the video compositing tree 505.

As shown in FIG. 8, the cache node Ecache1 of some embodiments changes colors during the rendering, to indicate that this node is currently being rendered in a background process. In these embodiments, the node Ecache1 will assume the default color for nodes when the background render process is complete and the node becomes available from a cache location, as shown in FIG. 9.

Figure 9:
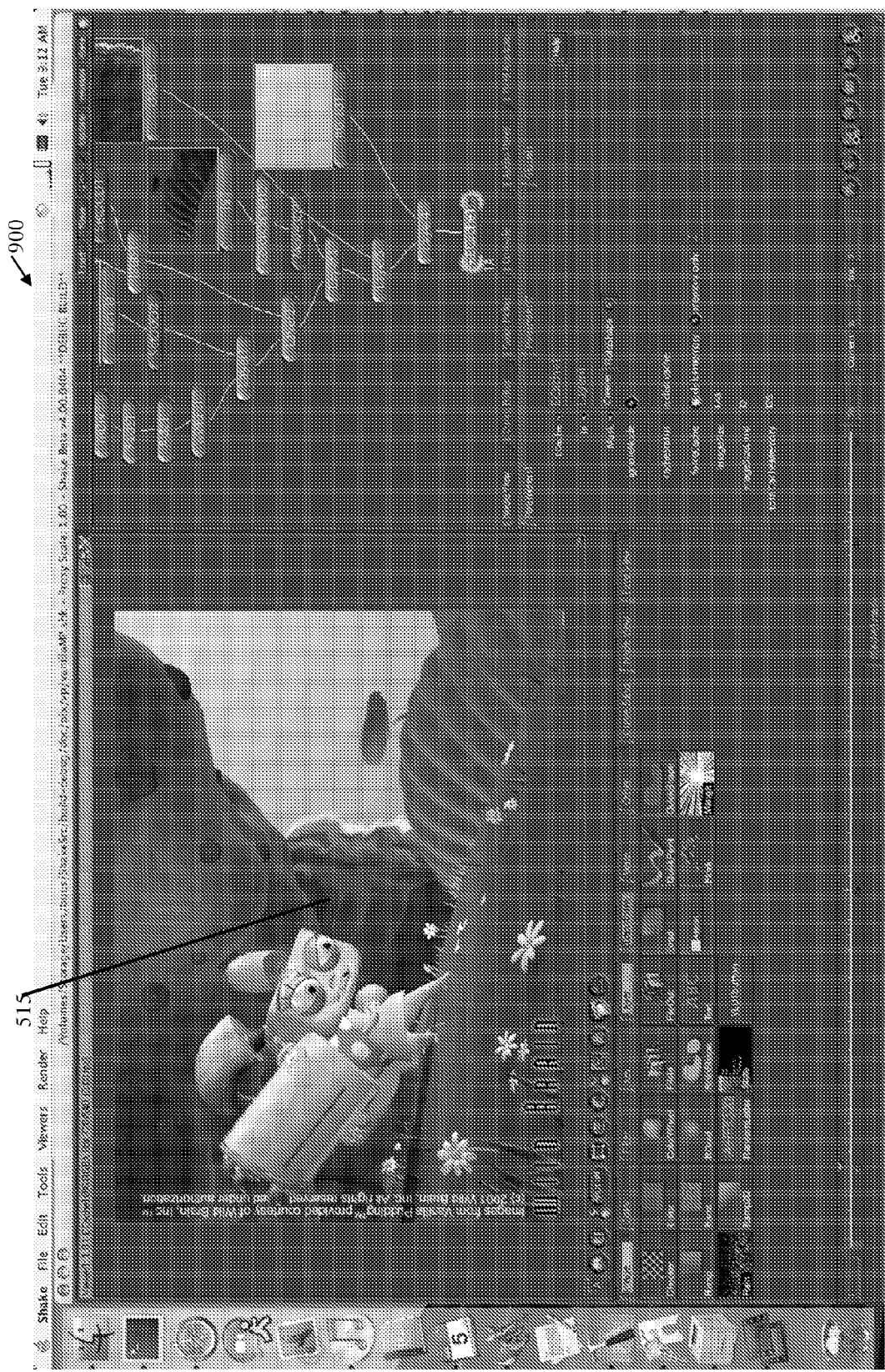
FIG. 9 illustrates a user interface containing a node that has an associated cached render.

In other words, the embodiments illustrated in FIGS. 8 and 9 use two different colors for the node Ecache1 to show two different stages in the rendering process: (1) a first color to show that background rendering is being performed at this node, and (2) a second color to indicate the completion of the background rendering. Other embodiments, however, might use more than two colors to show more than two stages in the rendering process.

Figure 10:
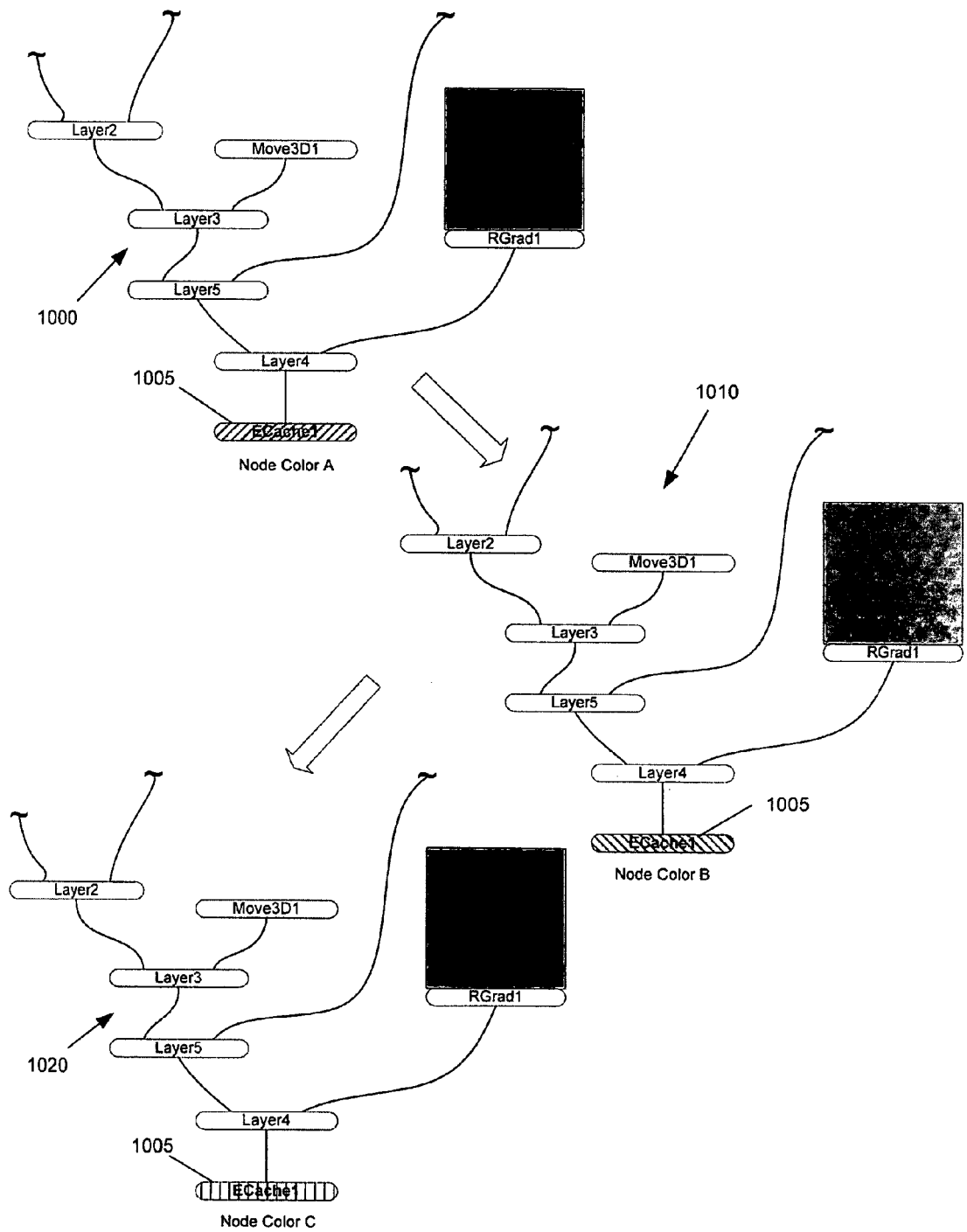
FIG. 10 illustrates a representative portion of a user interface to show the use of node color to indicate status of caching to memory or disk.

For instance, some embodiments use (1) a first color to indicate that rendering has not begun, (2) a second color to indicate that rendering is in process, and (3) a third color to indicate the completion of rendering. FIG. 10 illustrates one such embodiment. Specifically, this figure presents one fragment of the node tree 505 at three different stages 1000, 1010 and 1020 of a rendering process. This fragment contains the cache node 1005, which has a different color in each of the stage of the rendering process.

The first stage 1000 illustrated in FIG. 10 is before the selection of the cache node 1005 for background rendering. In this stage, the cache node 1005 has a first color, which is indicated by one style of cross-hatching. Subsequently, in the second stage 1010, the application is background rendering the cache node 1005. At this stage, the cache node 1005 has a second color that is illustrated by another style of cross-hatching. Finally, in the third stage 1020, the background rendering of the cache node is completed, and this completion is illustrated with a third color, which is presented in FIG. 10 by yet another style of cross-hatching.

Some embodiments use two or more colors to indicate the cache state of a cache node, instead of indicating the rendering state of a cache node. For instance, the color-coding example illustrated in FIG. 10 could be used to illustrate three different cache states of the cache node 1005. In some embodiments, the coloring of the cache node in the first stage 1000 of FIG. 10 indicates that the cache node has not yet been rendered or has been rendered but the rendered results are not in the disk cache 215 or the memory cache 210. In the second stage 1010, these embodiments use the coloring of the cache node to indicate that the cache node has been rendered and the rendered results are in the memory cache 215. Finally, in the third stage 1020, these embodiments use the coloring of the cache node to indicate that the cache node's rendered results are in the disk cache 210.

Instead of colors, or in conjunction with colors, some embodiments use other visual cues to indicate different stages in the rendering and/or caching process of a cache node. For instance, some embodiments indicate the status of a caching or rendering process of a cache node by changing the shape of the cache node.

Figure 11:
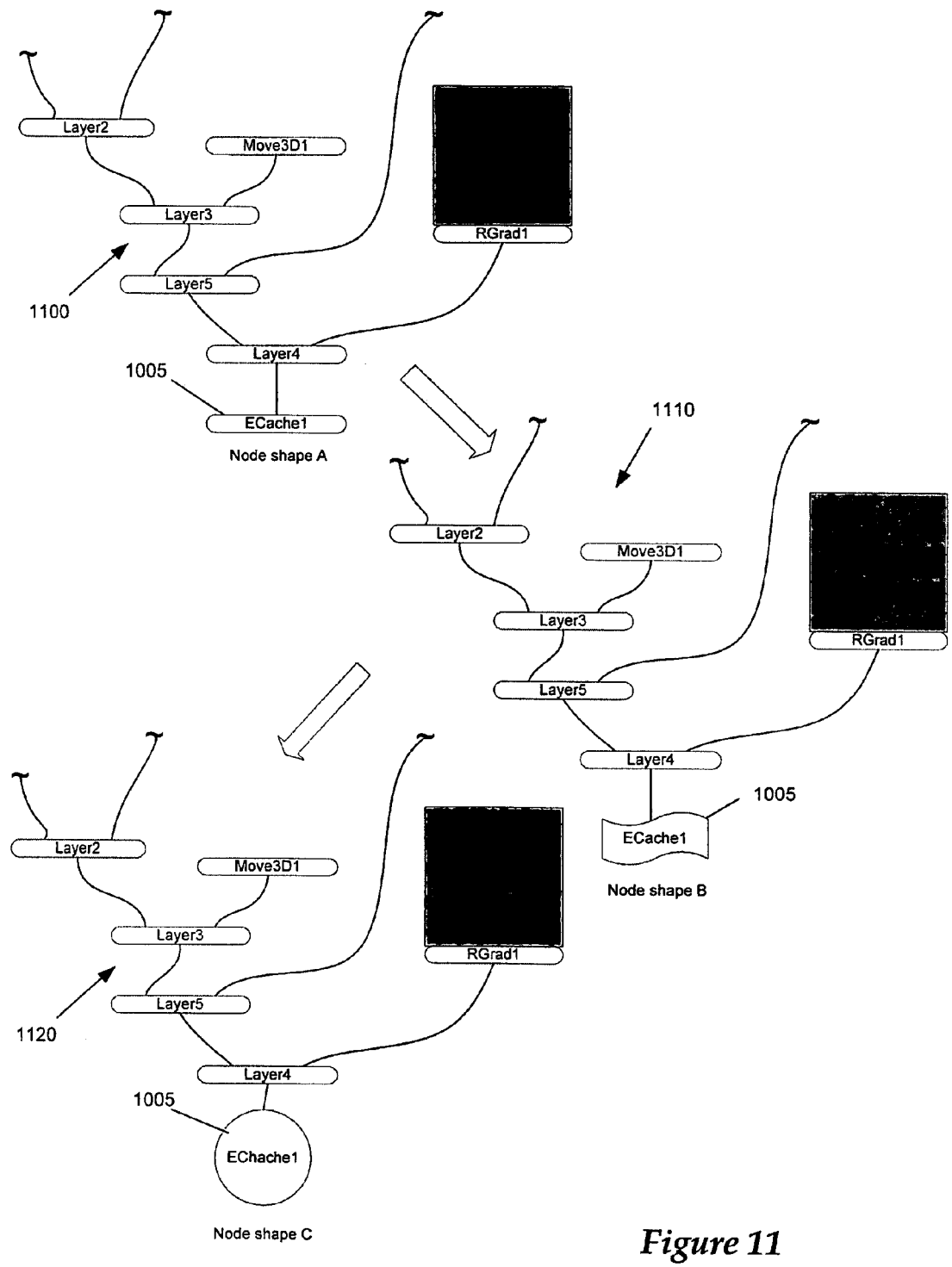
FIG. 11 illustrates a representative portion of a user interface to show the use of node shape to indicate status of caching to memory or disk.

FIG. 11 illustrates one such example. Specifically, like FIG. 10, this figure illustrates a fragment of the node tree 505 during three stages of a rendering or caching process. Unlike FIG. 10, FIG. 11 illustrates the changing of the shape of the cache node at each stage of the rendering or caching process. In FIG. 11, the cache node 1005 has a first shape A during the first stage 1100, a second shape B during the second stage 1110, and a third shape C during the third stage 1120. As mentioned above, the three stages of the rendering process might be (1) Not Rendered, (2) Being Rendered, and (3) Rendering Completed, while the three stages of the caching process might be (1) Not Cached, (2) Cached to Disk, and (3) Cached to Memory.

Figure 12:
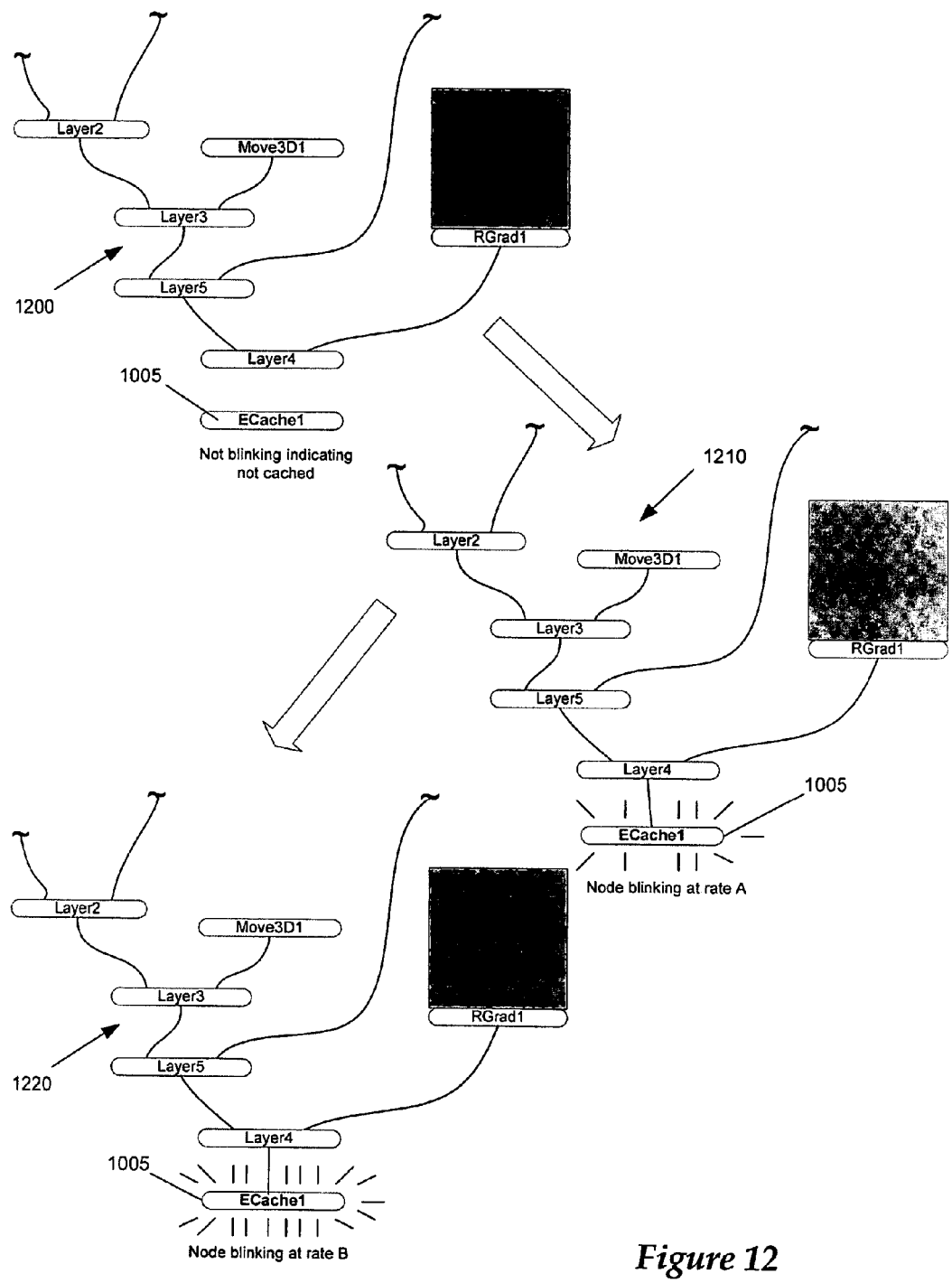
FIG. 12 illustrates a representative portion of a user interface to show the use of node blinking to indicate status of catching to memory or disk.

Another visual cue that some embodiments might use is blinking. FIG. 12 illustrates one such example. Specifically, like FIG. 10, this figure illustrates a fragment of the node tree 505 during three stages of a rendering process. Unlike FIG. 10, FIG. 12 uses the blinking of the cache node and the color of this node to indicate each stage of the rendering process. In FIG. 12, the cache node 1005 (1) has a constant first color A during the first stage 1200 to indicate that the node is not rendered, (2) blinks (e.g., alternates between two colors or two shades of the same color) during the second stage 1210 to indicate that the node is being rendered, and (3) has another color B during the third stage 1220 to indicate that the rendering is completed. Blinking can also be used to indicate different stages in the caching process.

Instead of or in conjunction with using visual cues (e.g., colors, shapes, blinking) for cache nodes, some embodiments use visual cues to illustrate the rendering or caching state of non-cache nodes in a compositing tree that illustrates various stages of a video compositing process. For instance, some embodiments might use such visual cues to illustrate the rendering status of each node in the tree during the rendering of the entire compositing tree or a particular portion of it.

Figure 13:
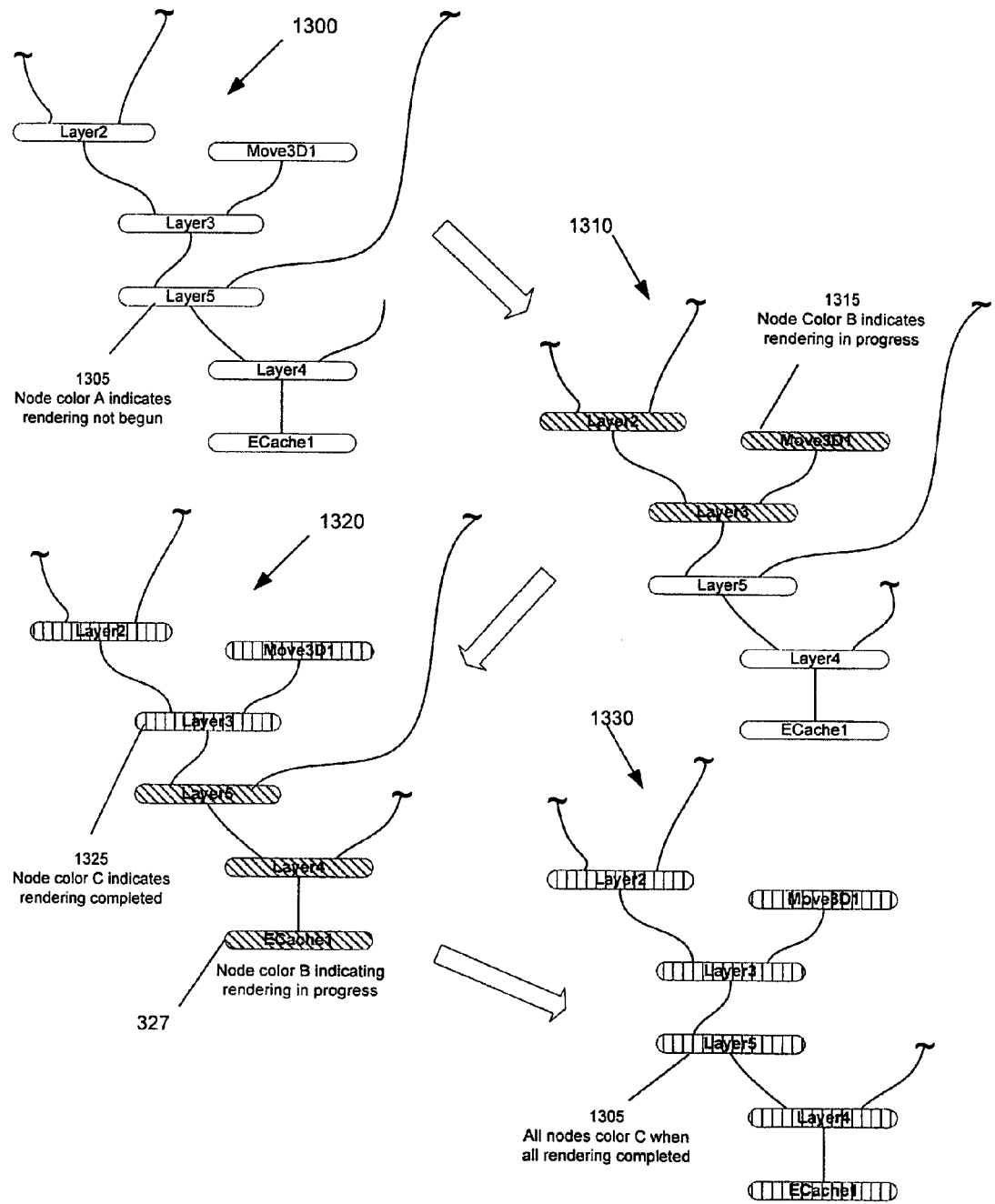
FIG. 13 illustrates a representative portion of a user interface to show the use of node color to indicate rendering and caching progress status for any type of node.

FIG. 13 illustrates one such example. The example in this figure illustrates one fragment of the node tree 505 during four snapshots 1300, 1310, 1320 and 1330 in time of the rendering process. In the first snapshot 1300, the rendering process has not started and all the nodes in the tree 505 have the same color A. Subsequently, in the second snapshot 1310, rendering has started for some of the nodes (such as node 1315) and the start of the rendering for these nodes is indicated by the change of their color to color B.

Next, in the third snapshot 1320, the rendering of some of the nodes (including node 1325) has been completed and their color has changed to color C. Also, in this snapshot, the rendering of the other nodes (such as node 1327) has started and their color has changed to color B. In the last snapshot 1330, the rendering of all the nodes has been completed and their color has changed to color C.

In addition to color, various embodiments utilize node shape or blinking as visual cues to display the status of the render process. Some embodiments use a combination of two or more different types of visual cues to provide the user with the status of rendering or caching of different nodes.

Figure 14:
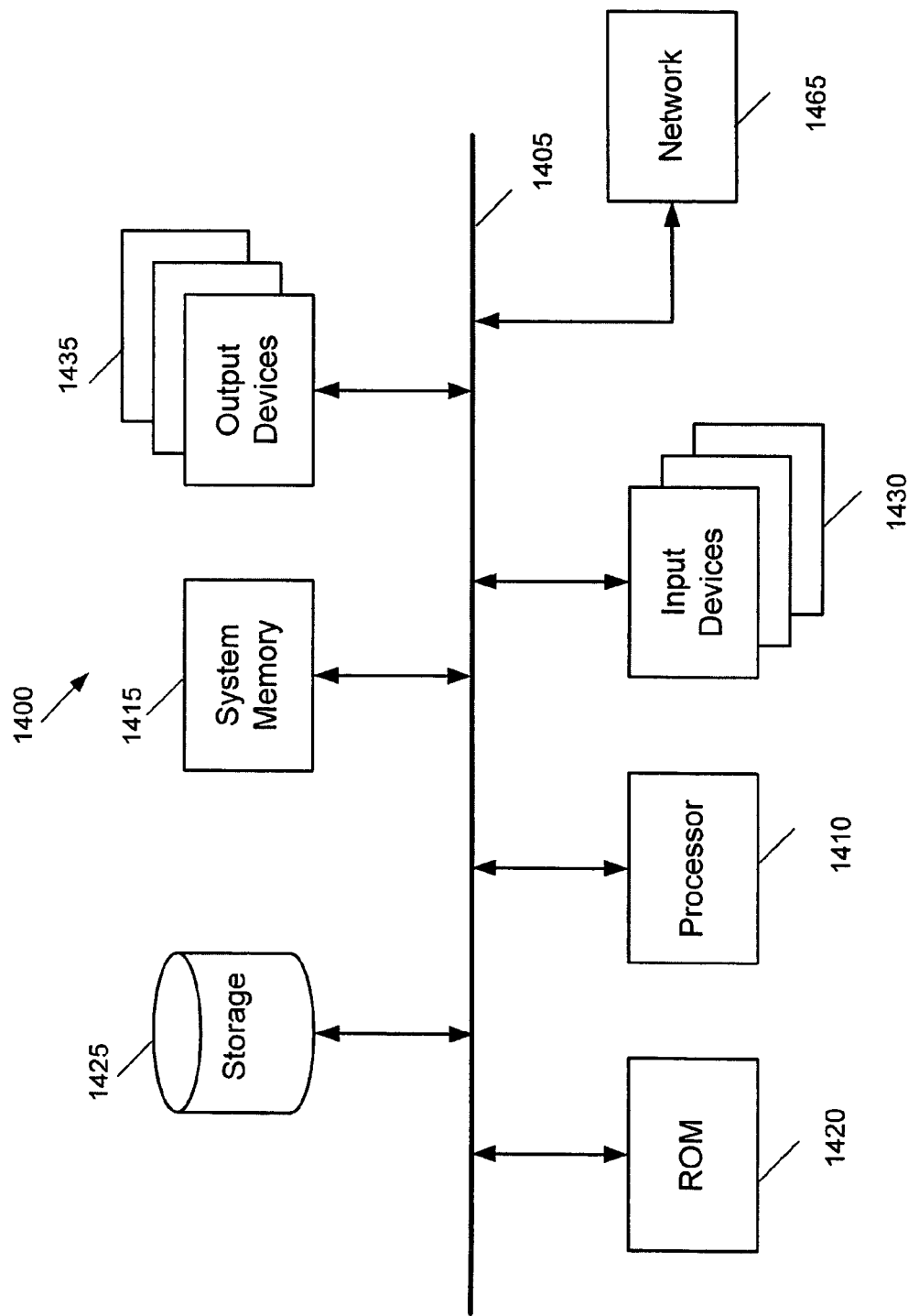
FIG. 14 presents a computer system with which one embodiment of the invention is implemented.

FIG. 14 presents a computer system with which one embodiment of the invention is implemented. Computer system 1400 includes a bus 1405, a processor 1410, a system memory 1415, a read-only memory 1420, a permanent storage device 1425, input devices 1430, and output devices 1435. The bus 1405 collectively represents all system, peripheral, and chipset buses that communicatively connect the numerous internal devices of the computer system 1400. For instance, the bus 1405 communicatively connects the processor 1410 with the read-only memory 1420, the system memory 1415, and the permanent storage device 1425.

From these various memory units, the processor 1410 retrieves instructions to execute and data to process in order to execute the processes of the invention. The read-only-memory (ROM) 1420 stores static data and instructions that are needed by the processor 1410 and other modules of the computer system.

The permanent storage device 1425, on the other hand, is read-and-write memory device. This device is a non-volatile memory unit that stores instruction and data even when the computer system 1400 is off. Some embodiments of the invention use a mass-storage device (such as a magnetic or optical disk and its corresponding disk drive) as the permanent storage device 1425.

Other embodiments use a removable storage device (such as a floppy disk or zip® disk, and its corresponding disk drive) as the permanent storage device. Like the permanent storage device 1425, the system memory 1415 is a read-and-write memory device. However, unlike storage device 1425, the system memory is a volatile read-and-write memory, such as a random access memory. The system memory stores some of the instructions and data that the processor needs at runtime. In some embodiments, the invention's processes are stored in the system memory 1415, the permanent storage device 1425, and/or the read-only memory 1420.

The bus 1405 also connects to the input and output devices 1430 and 1435. The input devices enable the user to communicate information and select commands to the computer system. The input devices 1430 include alphanumeric keyboards and cursor-controllers. The output devices 1435 display images generated by the computer system. For instance, these devices display the GUI of a video editing application that incorporates the invention. The output devices include printers and display devices, such as cathode ray tubes (CRT) or liquid crystal displays (LCD).

Finally, as shown in FIG. 14, bus 1405 also couples computer 1400 to a network 1465 through a network adapter (not shown). In this manner, the computer can be a part of a network of computers (such as a local area network ("LAN"), a wide area network ("WAN"), or an Intranet) or a network of networks (such as the Internet). Any or all of the components of computer system 1400 may be used in conjunction with the invention. However, one of ordinary skill in the art would appreciate that any other system configuration may also be used in conjunction with the present invention.

While the invention has been described with reference to numerous specific details, one of ordinary skill in the art will recognize that the invention can be embodied in other specific forms without departing from the spirit of the invention. For instance, FIGS. 2 and 3 illustrate two levels of caching: a memory cache and a disk cache. Also, one description of FIG. 10 pertained to the color of the node 1005 changing to indicate one of the following cache states: not cached, cached to memory, cached to disk. Other embodiments, however, might only have two cache states: cached and not cached. In some of these embodiments, the caching is only to the memory and not to disk. Some of these embodiments might have another memory cache that is not used for rendering nodes to cache, but is rather used for caching GUI operations.

Several embodiments were described above by reference to examples to particular sequences of color changes, shape changes, or blinking. One of ordinary skill would realize that other examples and combinations of visual cues for the progress of rendering and caching are also possible.

In some embodiments described above, the only nodes that can be rendered to a cache are cache nodes. Other embodiments, however, allow other nodes to be rendered to cache. For instance, some embodiments might have some or all nodes in a compositing tree have an attribute that specifies whether the node can be cached. When this attribute of a node specifies that a node be cached, the node can be background rendered and the rendered can then be stored in the disk or memory cache.

Also, the embodiments described above may be implemented in one or more modules separately or as part of an application, e.g., the Shake® application provided by Apple Computer, Inc. Thus, one of ordinary skill in the art will understand that the invention is not to be limited by the foregoing illustrative details, but rather is to be defined by the appended claims.

We claim:

1. A method for identifying cache stages in a multi-stage video editing process in a computer system, the method comprising:
- displaying the multi-stage video editing process on a display device of the computer system as a composite tree having a plurality of nodes with each node representing an editing stage in the multi-stage video editing process;
- displaying a particular node of the composite tree with a first visual cue to identify a first cache stage for an editing stage represented by the particular node; and
- displaying the particular node with a second visual cue to identify a second cache stage for the editing stage represented by the particular node, the second visual cue having a different visual effect than the first visual cue.

2. The method of claim 1, wherein displaying the first visual cue comprises displaying the particular node of the composite tree with a first color, wherein displaying the second visual cue comprises displaying the particular node of the composite tree with a second color.

3. The method of claim 1, wherein displaying the first visual cue comprises displaying the particular node of the composite tree using a first shape, wherein displaying the second visual cue comprises displaying the particular node of the composite tree using a second shape.

4. The method of claim 1, wherein displaying the first visual cue comprises displaying the particular node of the composite tree using a first blinking rate, wherein displaying the second visual cue comprises displaying the particular node of the composite tree with a second blinking rate.

5. The method of claim 1 further comprising using a third visual cue to identify a third cache stage for the editing stage in the multi-stage video editing process, the third visual cue having a different visual effect than the first and second visual cues.

6. The method of claim 5, wherein the computer system has a disk cache and a memory cache, wherein the first cache stage is a stage when the editing stage has not been rendered to a cache, wherein the second cache stage is a stage when the editing stage has been rendered and a result of the rendering is in the memory cache, and the third cache stage is a stage when the editing stage has been rendered and a result of the rendering is in the disk cache.

7. The method of claim 6, wherein the computer system has a disk storage and a random access memory, wherein the disk cache and the memory cache are respectively areas in the disk storage and the random access memory that are specifically allocated for the video editing process.

8. The method of claim 1, wherein the first cache stage is a stage when the editing stage has not been rendered to a cache, wherein the second cache stage is a stage when the editing stage has been rendered to the cache.

9. The method of claim 8, wherein the computer system has a memory space, wherein the cache is an area in the memory space that has been specifically allocated for the video editing process.

10. The method of claim 8, wherein the computer system has a random access memory, wherein the cache is an area in the random access memory that is specifically allocated for the video editing process.

11. The method of claim 8, wherein the computer system has a disk storage, wherein the cache is an area in the disk storage that is specifically allocated for the video editing process.

12. A method for identifying rendered states in a multi-stage video editing process in a computer system, the method comprising:
- displaying the multi-stage video editing process on a display device of the computer system as a composite tree having a plurality of nodes with each node representing an editing stage in the multi-stage video editing process;
- displaying a particular node of the composite tree with a first visual cue to identify a first rendered state for an editing stage represented by the node; and
- displaying the particular node with a second visual cue to identify a second rendered state for the editing stage represented by the node, the second visual cue having a different visual appearance than the first visual cue.

13. The method of claim 12, wherein the first rendered state is a state when the editing stage has not been rendered, wherein the second rendered state is a state when the editing stage has been rendered.

14. The method of claim 12, wherein displaying the first visual cue comprises displaying the particular node of the composite tree with a first color, wherein displaying the second visual cue comprises displaying the particular node of the composite tree with a second color.

15. The method of claim 12, wherein displaying the first visual cue comprises displaying the particular node of the composite tree using a first shape, wherein displaying the second visual cue comprises displaying the particular node of the composite tree using a second shape.

16. A non-transitory computer readable medium storing a computer program for displaying cache stages in a multi-stage video editing process in a computer system, the computer program comprising sets of instructions for:
- displaying the multi-stage video editing process on a display device of the computer system as a composite tree having a plurality of nodes with each node representing an editing stage in the multi-stage video editing process;
- displaying a particular node of the composite tree with a first color to display a first cache stage for an editing stage represented by the node; and
- displaying the particular node with a second color which is different than the first color to display a second cache stage for the editing stage represented by the node.

17. The non-transitory computer readable medium of claim 16, wherein the computer program further comprises a set of instructions for using a third color which is different than the first and second colors to display a third cache stage for the editing stage in the multi-stage video editing process.

18. The non-transitory computer readable medium of claim 17, wherein the computer system has a disk cache and a memory cache, wherein the first cache stage is a stage when the editing stage has not been rendered to a cache, wherein the second cache stage is a stage when the editing stage has been rendered and a result of the rendering is in the memory cache, and the third cache stage is a stage when the editing stage has been rendered and the result of the rendering is in the disk cache.

19. The non-transitory computer readable medium of claim 18, wherein the computer system has a disk storage and a random access memory, wherein the disk cache and the memory cache are respectively areas in the disk storage and the random access memory that are specifically allocated for the video editing process.

20. A non-transitory computer readable medium storing a computer program for displaying rendered states in a multi-stage video editing process in a computer system, the computer program comprising sets of instructions for:
- displaying the multi-stage video editing process on a display device of the computer system as a composite tree having a plurality of nodes with each node representing an editing stage in the multi-stage video editing process;

displaying a particular node of the composite tree with a first color to display a first rendered state for an editing stage represented by the node; and displaying the particular node with a second color which is different than the first color to display a second rendered state for the editing stage represented by the node.

21. The non-transitory computer readable medium of claim 20, wherein the first rendered state is a state when the editing stage has not been rendered, wherein the second rendered state is a state when the editing stage has been rendered.

22. The non-transitory computer readable medium of claim 20, wherein the computer program further comprises a set of instructions for using a third color which is different than the first and second colors to display a third rendered state for the editing stage in the multi-stage video editing process.

* * * * *